(No Model.)
LAMIRA PHELPS.
Divorced, and now LAMIRA LUCAS.
PASTRY PIE GUARD.
No. 385,683.                      Patented July 3, 1888.
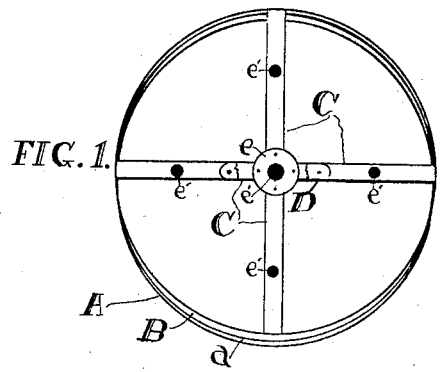
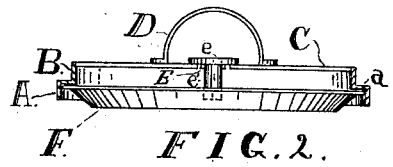
WITNESSES:
Jno. P. Tenshaaf
Alfred M. Perry
INVENTOR,
Lamira Phelps,
BY Ittiel J. Cilley,
Elvander W. Dodge,
her ATTORNEYS.

United States Patent Office.

LAMIRA PHELPS, (DIVORCED, AND NOW LAMIRA LUCAS,) OF LOWELL, MICHIGAN; SAID LAMIRA LUCAS ASSIGNOR OF ONE HALF TO ELVANDER W. DODGE, OF SAME PLACE.

PASTRY-PIE GUARD.

SPECIFICATION forming part of Letters Patent No. 385,683, dated July 3, 1888.

Application filed January 16, 1888. Serial No. 260,955. (No model.)

*To all whom it may concern:*

Be it known that I, LAMIRA PHELPS, a citizen of the United States of America, residing at the village of Lowell, in the county of Kent and State of Michigan, have invented a new and useful Improvement in Pastry-Pie Guards, of which the following is a specification.

My invention relates to improvements in utensils for baking pastry-pies; and the objects of my invention are, first, to provide a ready and convenient means of trimming the edges of the crusts or covering of the pie after it has been arranged in the tins; second, to provide a means of holding the edges of the upper and lower crusts together and to prevent the escape of the filling while baking; third, to provide a ready means of escape for any steam that may generate in the pie during the process of baking; fourth, to avert the danger of the filling of the pie escaping through and staining the outer surface of the upper crust of the pie, and, fifth, to provide a means of preventing the escape of the filling or juice of the pie over the edge of the pie tin or plate into the oven during the process of baking, thus averting the danger of burning the same and filling the oven or room with the disagreeable odor of burning and smoking pastry. I attain these objects by the mechanism illustrated in the accompanying drawings, in which—

Figure 1 is a top view of my invention with the handle removed to show the position of the central steam-tube; and Fig. 2 is a side view of the same in section, arranged to show the manner of applying it to the pie-tin F.

Similar letters refer to similar parts throughout the several views.

My device may be made of tin or other suitable material, and is formed with a rim, A B, having an offset, $a$, arranged to rest upon the upper surface of the edge of the pie-crust, the lower portion, A, of the rim being made of a proper size to exactly fit over the pie-tin, as shown in Fig. 1, and designed, first, as a trimmer to cut or trim the edges of the pie-crusts, in which process the edge of the upper crust is drawn slightly over and carried by the edge of the lower crust, thus forming a "lap" joint between the two crusts; second, as a guard to hold the edges of the crust in place while in the process of baking, the offset $a$ sitting back a sufficient distance to rest upon and secure the edges of the crust. This offset may be made at right angles with the rims, slightly inclined or curved, and may be made plain, corrugated, or figured, for the purpose of ornamenting the upper surface of the crust for a short distance from the edge.

The upper rim, B, is attached to the inner circle of the offset, and is of a proper height to avert the danger of the upper crust of the pie "raising" or "bulging" sufficiently to come in contact with the arms C.

The arms C are attached at one end to the upper rim, B, and at the other end to the center piece, E, and are intended to act, first, as braces to support the rim, and, second, as supports for the steam-tubes $e'$. The number or form of these arms is immaterial to my invention.

The handle D, when applied, is attached to two continuous arms, as shown in the accompanying drawings, Fig. 1, but is not essential to my invention.

The center piece, E, is constructed with a head, $e$, made of tin, Russia iron, or other suitable material, which is attached to the inner ends of the arms C, and with a tube, $e'$, which extends downward a sufficient distance to pass through and a short distance below the upper crust of the pie. This tube is hollow its entire length and open at both ends for the free escape of steam from the filling of the pie during the process of baking.

My device is so arranged that more than one of these tubes may be used, if desired, by attaching them to the arm C, as shown in Fig. 1. These tubes may be made of any desired form, though I prefer to have them round or oval, as being more readily applied and conveniently fitted into the apertures cut into the crust to receive them.

To use my device, place the pie in the tin in the usual manner, with the crusts untrimmed; cut a short "slit" into the upper crust for the reception of each tube; take the guard by the handle and press it down over the pie-tin until the offset is embedded into the crust of the pie at the edges and holds them firmly together, in the meantime being careful to enter the tubes into the apertures cut in the crust for their reception. By this means the rim A will trim the pie-crusts to the exact size of the tin and draw the edge of the upper crust over the edge of the lower crust. Press gently upon the handle of the guard until the offset $a$ is slightly embedded into the upper crust and the edges of the two crusts are brought together sufficiently to cause them to unite and form a joint through which the filling of the pie cannot escape, the shoulder B $a$ at the same time forming a close joint with the upper crust of the pie, so that in case the juices should escape to the top of the upper crust it could not flow off of the pie into the oven and burn, as hereinbefore mentioned. Form a perfect joint with the crust round the tubes $e'$ and bake the pie with the guard in position, as described.

Having thus fully described my invention, what I claim as new, and desire to secure by Letters Patent of the United States, is—

1. A pastry-pie guard constructed with an annular rim, A B, provided with an offset, $a$, and with arms C, attached to the upper edges of the rim and extending across from side to side, a handle, D, attached to the center of the arms, a center piece, E, attached to the center of the arms, and a tube, $e'$, depending from the arm, substantially as and for the purpose set forth.

2. The combination, in a pie-guard, of the rim A B, connected by or provided with an offset, $a$, arms C, and tube or tubes $e'$, supported by the arms C, substantially as and for the purpose set forth.

In witness whereof I do hereby sign my name, at the village of Lowell, in the county of Kent and State of Michigan, this 7th day of January, A. D. 1886.

LAMIRA PHELPS.

In presence of—
H. W. STONE,
MARTIN N. HINE.